H. G. ANDERSON.
PLOW.
APPLICATION FILED SEPT. 11, 1911.
1,041,227.
Patented Oct. 15, 1912.
3 SHEETS—SHEET 1.
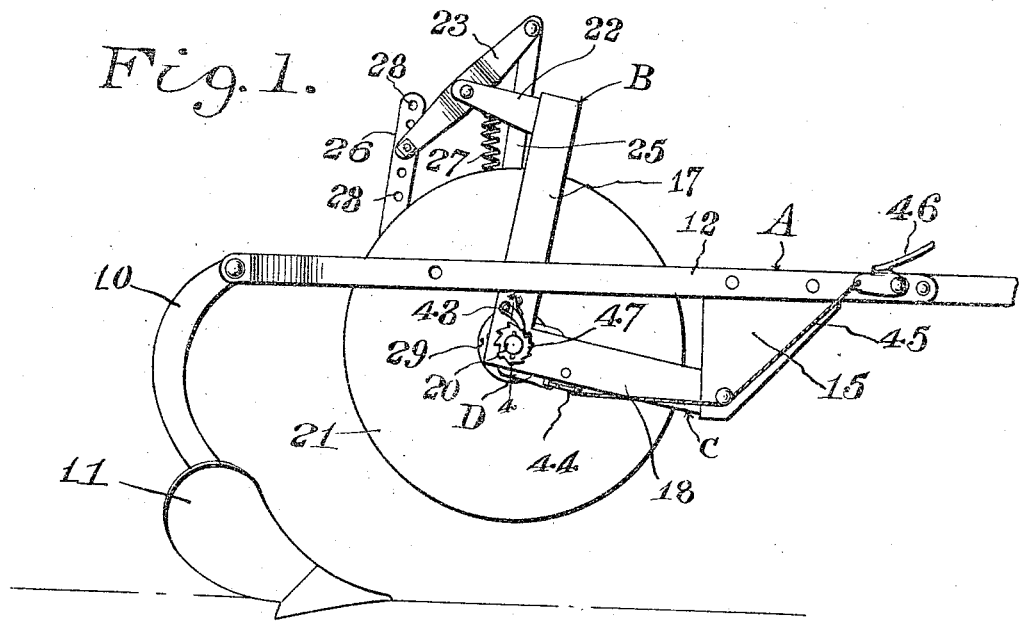
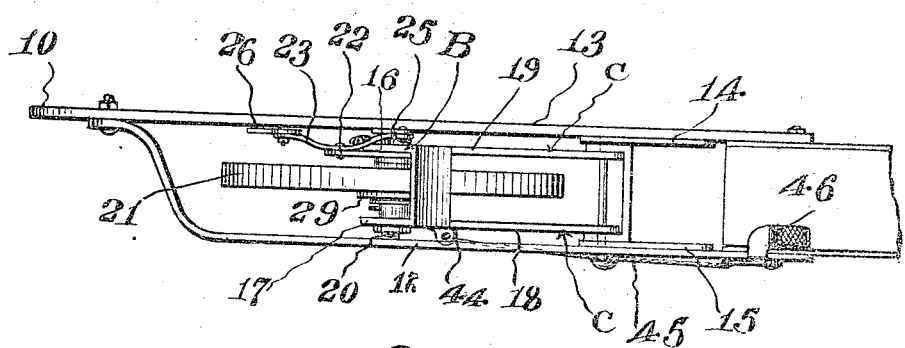
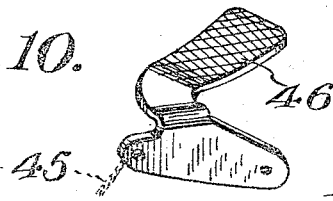
Witnesses:
Inventor,
H. G. Anderson.
By
Attorneys H. G. ANDERSON.
PLOW.
APPLICATION FILED SEPT. 11, 1911.
1,041,227.
Patented Oct. 15, 1912.
3 SHEETS—SHEET 2.
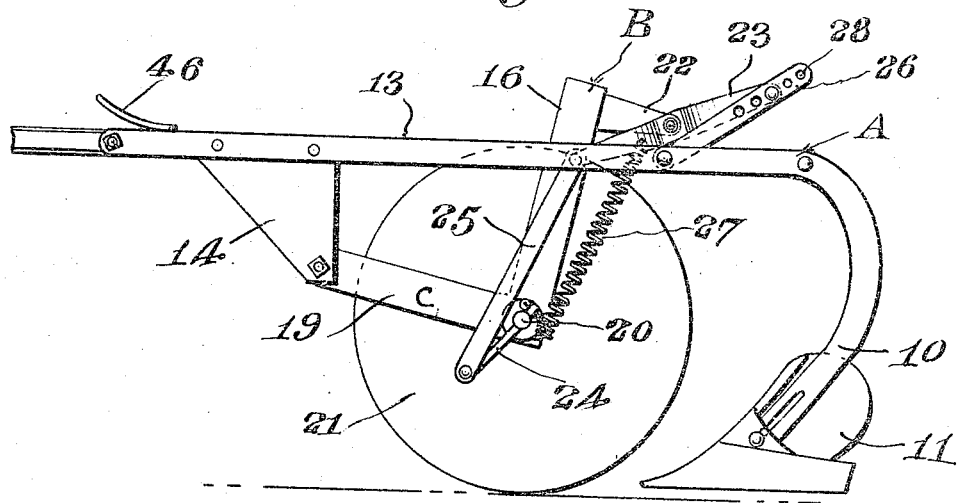
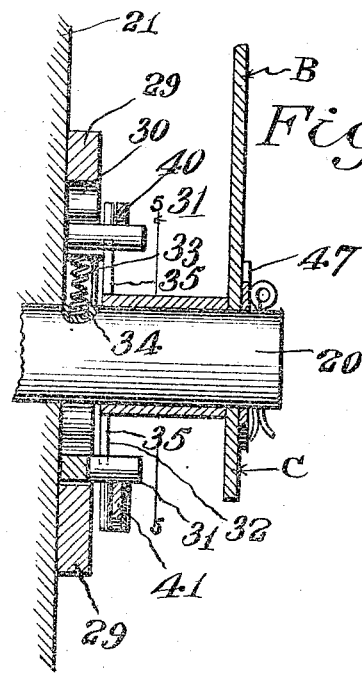
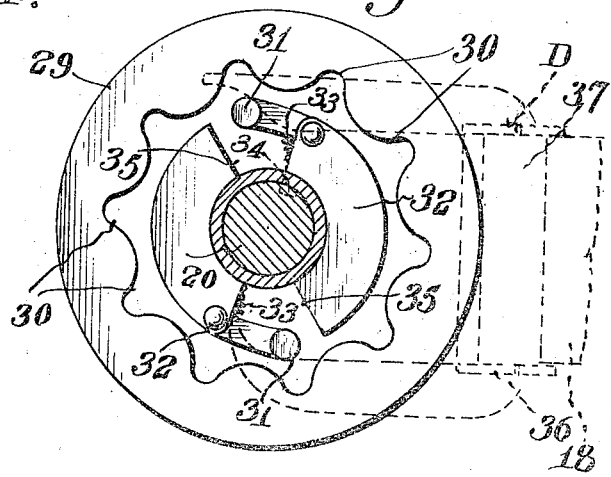
Witnesses:
J. P. Wahler
Henry T. Bright
Inventor
H. G. Anderson,
By (signature)
Attorneys

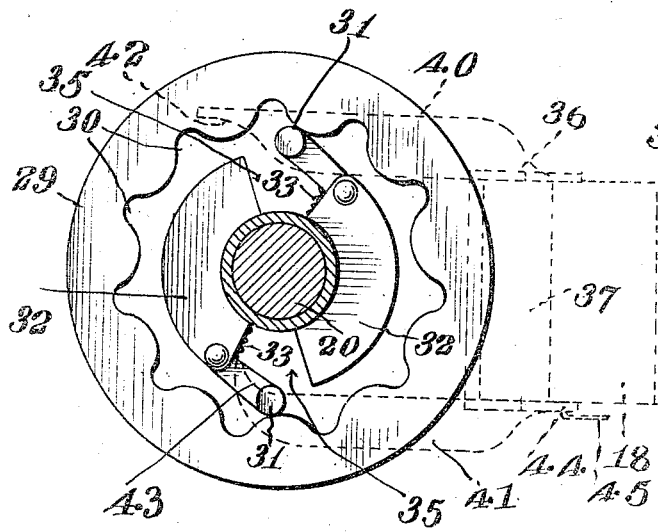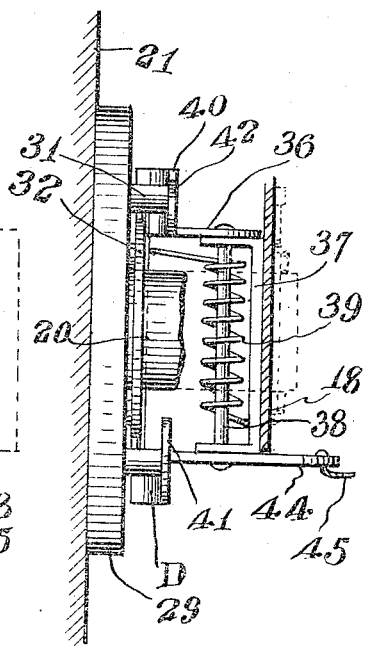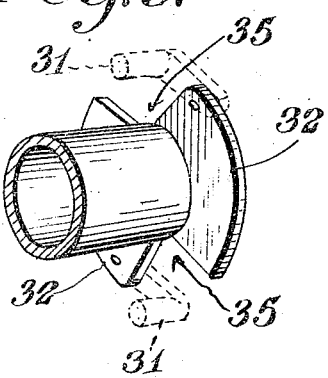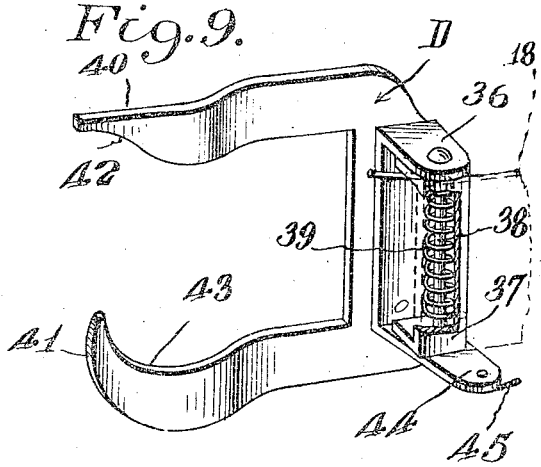

UNITED STATES PATENT OFFICE.

HENNING G. ANDERSON, OF BARNEY, NORTH DAKOTA.

PLOW.

1,041,227.  Specification of Letters Patent.  Patented Oct. 15, 1912.

Application filed September 11, 1911. Serial No. 648,741.

*To all whom it may concern:*

Be it known that I, HENNING G. ANDERSON, a citizen of the United States, residing at Barney, in the county of Richland, State of North Dakota, have invented certain new and useful Improvements in Plows; and I do hereby declare the following to be a full, clear, and exact description of the invention, such as will enable others skilled in the art to which it appertains to make and use the same.

This invention relates to plows and more particularly to means whereby the plow beam may be raised and lowered relatively to the supporting wheel of the plow.

The object of the invention resides in the provision of a plow which includes means for raising and lowering the plow beam relatively to the supporting wheel of the plow, said means being adapted to be operatively engaged with the supporting wheel so that the rotation of the latter will effect the raising and lowering of the plow beam, and further adapted to be automatically disconnected from the plow wheel at the termination of either the raising or lowering of the plow as the case may be.

With the above and other objects in view the invention consists in the details of construction and in the arrangement and combination of parts, to be hereinafter more fully described and particularly pointed out in the appended claims.

In describing the invention in detail reference will be had to the accompanying drawings wherein like characters of reference denote corresponding parts in the several views, and in which—

Figure 1 is a side elevation showing the plow in lowered position, Fig. 2, a side elevation viewed from the opposite side and showing the plow in raised position, Fig. 3, a plan view of what is shown in Fig. 1, Fig. 4, a section on the line 4—4 of Fig. 1, Fig. 5, a section on the line 5—5 of Fig. 4 with the tripping lever shown in dotted lines. Fig. 6, a view similar to Fig. 5 showing the position of the parts of the clutch connection after same has been thrown into operative engagement with the supporting wheel whereby a fixed connection is established between the supporting wheel and its shaft. Fig. 7, an enlarged rear elevation of the clutch connection with the parts in the position shown in Fig. 6, Fig. 8, a detail perspective view of the dog carrying plate of the clutch connection, Fig. 9, a detail perspective view of the tripping lever and its adjacent parts, said lever being adapted to automatically trip the dogs of the clutch connection and disengage the parts of the latter to allow the plow wheel to freely rotate upon its shaft, and Fig. 10 a detail perspective view of the foot lever which is utilized to actuate the tripping lever when it is desired to operate the clutch connection to effect the simultaneous rotation of the plow wheel and its axle or shaft.

Referring to the drawings, A indicates generally a plow beam having the usual depending portion 10 at its rear end carrying the plow blade 11. The beam A further includes a pair of parallel arms 12 and 13 which have depending from their forward ends respectively plates 14 and 15. Disposed between the arms 12 and 13 is an L-shaped frame which is formed of U-shaped portions B and C the former including parallel spaced arms 16 and 17 and the latter parallel spaced arms 18 and 19. Journaled in the L-shaped frame at the junction of the arms of respective U-shaped portions B and C is a shaft 20 upon which is loosely mounted a wheel 21. The outer end of the U-shaped portion C is pivotally mounted between the plates 14 and 15 so that the plow beam A is capable of moving up and down relatively to the wheel 21.

Mounted at the inner end of the arm 16 of the U-shaped portion B is a laterally directed bracket 22 upon which is pivotally mounted a walking beam 23. Fixed on the end of the shaft 20 adjacent the arm 16 is a crank arm 24 the free end of which is connected by a link 25 with one end of the walking beam 23. The opposite end of this walking beam 23 is pivotally connected with a link 26, the latter being pivotally mounted upon the arm 13 of the beam A adjacent the rear end of said arm. By this construction it will be apparent, upon reference to Fig. 2, that as the shaft 20 is rotated counterclockwise the crank arm 24 will cause the link 25 to raise the forward end of the walking beam 23 and lower the rear end of the latter. This lowering of the rear end of the walking beam will result in a downward movement of the plow beam A to the position shown in Fig. 1. Again, continued rotation of the shaft 20 will, through the medium of the various connections previously referred to, result in the plow beam A being again elevated to the position shown in Fig. 2.

In order to aid in elevating the plow beam A there is provided a balance spring 27 one end of which is secured to the L-shaped frame at the junction of the arms 16 and 19 while the other end thereof is anchored to the walking beam 23 forward of the pivotal connection of the latter with the bracket 22. When the plow beam A has been lowered to its limit it will be apparent that the tension of the spring 27 will afford material assistance in operating the various connections to effect the elevation of the beam A. The link 26 is provided with a plurality of openings 28 at spaced points therein whereby the adjacent end of the walking beam 23 may be connected to said lever in different adjustments and the particular point at which the walking beam is connected to the lever 26 will determine the extent of movement of which the plow beam A partakes during elevation and lowering.

In order to effect the raising and lowering of the beam A through the medium of the rotation of the wheel 21 there is provided an improved form of clutch connection between said wheel and the shaft 21, said connection being designed to connect the wheel and shaft so that the rotation of the former will raise or lower the beam A as previously described and then automatically disengage the wheel 21 from the shaft 20 when the beam A has been elevated or lowered to its full extent as the case may be. This clutch connection includes a ring 29 fixed on the wheel 21 adjacent the arms 18 and 17 and surrounding the shaft 20. The inner periphery of the ring 29 is provided with a plurality of recesses or notches 30 in which are adapted to engage dogs 31 pivotally mounted at diametrically opposite points upon a dog carrier 32 which is fixed upon the shaft 20. The dogs 31 are normally held in engagement with the inner periphery of the ring 29 by means of springs 33 which bear respectively at their outer ends against the dogs 31 and seat at their inner ends in suitable recesses 34 formed at diametrically opposite points in the periphery of the shaft 20. In order that the dogs 31 may be moved out of engagement with the inner periphery of the ring 29 the dog carrier 32 is provided with recesses 35 which are adapted to receive the free ends of the dogs 31 respectively when said dogs are moved away from the inner periphery of the ring 29 against the influence of the springs 33.

In order to move the free ends of the dogs 31 out of engagement with the inner periphery of the ring 29 at the termination of the raising or lowering movement of the beam A there is provided a tripping lever D which carries at one end a bracket 36 pivotally connected with another bracket 37 the latter of which is fixed upon the arm 18 of the U-shaped portion C. The pivotal connection between the brackets 36 and 37 is afforded by a pin 38 and this pin is encircled by a spring 39 one end of which engages the tripping lever D and constantly tends to force the free end of same toward the ring 29. The free end of the tripping lever D terminates in spaced fingers 40 and 41 which embrace the shaft 20. The finger 40 is provided with a cam face 42 while the finger 41 is provided with a cam face 43, said cam faces being so positioned that when the beam A has been elevated or lowered to its full extent the dogs 31 in their rotation will engage respective cam faces 42 and 43 and be forced inwardly or away from the inner periphery of the ring 29 and thus automatically effect the disengagement of the wheel 21 from the shaft 20 so that the beam A will cease to move under the influence of the rotation of the wheel 21 when it reaches the limit of either its upward or downward movement. The bracket 36 is provided with an extension 44 which is operatively connected by a cable 45 to a foot lever 46 pivoted upon the arm 12 of the beam A near the forward end of the latter.

It will be noted that when the wheel 21 is disconnected from the shaft 20 the dogs 31 are in engagement with the cam faces 42 and 43 respectively so that they are held away from the inner periphery of the ring 29. Now assuming that the beam A is in lowered position as shown in Fig. 1 and it is desired to raise said beam it is only necessary to press upon the foot lever 46 so as to swing the fingers 40 and 41 of the tripping lever D out of the path of travel of the dogs 31. This will result in the free ends of said dogs being moved under the influence of the springs 33 into the recesses 30 and thus lock the wheel 21 and the shaft 20 together so that they will rotate simultaneously. The foot lever 46 may then be released and the dogs 31 will slide along the inner face of the tripping lever D as the shaft 20 is rotated until a half rotation of said shaft is approached. When this stage in the rotation of the shaft is reached the dogs 31 will pass out of engagement with the inner face of the tripping lever D and the fingers 40 and 41 of the latter will then be thrown under the influence of the spring 39 into the path of travel of said dogs which will then pass into engagement with the cam faces 42 and 43 respectively and be actuated by such engagement away from the inner periphery of the ring 19 so that the wheel 21 will be ineffective to further rotate the shaft 20 and the beam A will remain in the elevated position to which it has just been actuated by the rotation of the shaft 20 under the influence of the rotation of the wheel 21.

In order to provide against any backward rotation of the shaft 20 there is fixed on said shaft a ratchet wheel 47 operatively engaged by a spring pawl 48 mounted on the arm 17 of the U-shaped portion B.

While the invention has been shown as applied to a plow having a single blade it will be apparent that it may be incorporated with equal facility in a plow having a plurality of blades or in a gangplow including a plurality of blades and beams without in any manner departing from the scope of the invention as set forth in the appended claims.

What is claimed is:—

1. The combination of a shaft, a supporting wheel loosely journaled thereon, a frame supported upon said shaft, a plow pivotally connected to said frame, a rock arm mounted upon the frame, connections between said rock arm and shaft whereby the rotation of the latter will oscillate the rock arm, connections between said plow and the rock arm whereby the oscillation of the latter will raise and lower said plow, and a clutch connection between the supporting wheel and the shaft for transmitting the rotation of said wheel to the shaft.

2. The combination of a shaft, a supporting wheel loosely journaled thereon, a frame supported upon said shaft, a rock arm mounted upon the frame, connections between the rock arm and shaft whereby the rotation of the latter will oscillate the rock arm, connections between said plow and the rock arm whereby the oscillation of the latter will raise and lower said plow, a clutch connection between the supporting wheel and the shaft for transmitting the rotation of said wheel to the shaft, and means for automatically throwing out said clutch connection at the termination of the elevating and lowering movements of the plow.

In testimony whereof, I affix my signature, in presence of two witnesses.

HENNING G. ANDERSON.

Witnesses:
   Math. Wilmerding,
   N. Berg.